United States Patent
Li (10) Patent No.: US 9,712,326 B2
(45) Date of Patent: Jul. 18, 2017

(54) METHOD AND SYSTEM FOR BACKING UP PRIVATE KEY OF ELECTRONIC SIGNATURE TOKEN

(71) Applicant: Tendyron Corporation, Beijing (CN)

(72) Inventor: Dongsheng Li, Beijing (CN)

(73) Assignee: Tendyron Corporation, Beijing (CN)

( * ) Notice: Subject to any disclaimer, the term of this patent is extended or adjusted under 35 U.S.C. 154(b) by 0 days.

(21) Appl. No.: 14/893,401

(22) PCT Filed: Apr. 18, 2014

(86) PCT No.: PCT/CN2014/075749
§ 371 (c)(1),
(2) Date: Nov. 23, 2015

(87) PCT Pub. No.: WO2014/187210
PCT Pub. Date: Nov. 27, 2014

(65) Prior Publication Data
US 2016/0105286 A1 Apr. 14, 2016

(30) Foreign Application Priority Data
May 23, 2013 (CN) .......................... 2013 1 0194259

(51) Int. Cl.
*H04L 9/32* (2006.01)
*H04L 9/14* (2006.01)
*H04L 9/08* (2006.01)

(52) U.S. Cl.
CPC .......... *H04L 9/3247* (2013.01); *H04L 9/0822* (2013.01); *H04L 9/0825* (2013.01);
(Continued)

(58) Field of Classification Search
CPC ....................................................... H04L 9/32
See application file for complete search history.

(56) References Cited

U.S. PATENT DOCUMENTS 7,478,078 B2 * 1/2009 Lunt ...................... G06Q 30/02
8,589,680 B2 * 11/2013 De Atley ............ G06F 11/1464
713/165
(Continued)

FOREIGN PATENT DOCUMENTS

CN 101488858 A 7/2009
CN 101567780 A 10/2009
(Continued)

OTHER PUBLICATIONS

PCT/CN2014/075749 English Translation of the International Search Report & Written Opinion of the International Searching Authority mailed Jul. 9, 2014, 10 pages.

*Primary Examiner* — Harunur Rashid
*Assistant Examiner* — Thanh Le
(74) *Attorney, Agent, or Firm* — Lathrop & Gage LLP (57) ABSTRACT

Provided are a method and system for backing up the private key of an electronic signature token, the method comprising: a first electronic signature token transmits a private key backup request data packet comprising a first signature; a second electronic signature token authenticates the first signature in the private key backup request data packet; if the first signature passes authentication, then determining whether the first electronic signature token has a backup relationship with the second electronic signature token; if yes, then encrypting the private key of the second electronic signature token, and transmitting a private key backup response data packet comprising a second signature and the encrypted private key; the first electronic signature token authenticates the second signature in the private key backup response data packet; if the second signature passes authentication, then determining whether the second electronic signature token has a primary-standby relationship with the (Continued)

first electronic signature token; and if yes, then decrypting the encrypted private key.

16 Claims, 2 Drawing Sheets

(52) U.S. Cl.
CPC .............. *H04L 9/0894* (2013.01); *H04L 9/14* (2013.01); *H04L 9/3234* (2013.01); *H04L 2209/24* (2013.01); *H04L 2209/72* (2013.01)

(56) References Cited

U.S. PATENT DOCUMENTS

| | | | | |
|---|---|---|---|---|
| 2004/0101141 | A1* | 5/2004 | Alve | G06F 21/602 |
| | | | | 380/278 |
| 2007/0074027 | A1* | 3/2007 | Tung | H04L 9/3247 |
| | | | | 713/176 |
| 2008/0104417 | A1* | 5/2008 | Nachtigall | H04L 9/0822 |
| | | | | 713/193 |

FOREIGN PATENT DOCUMENTS

| | | |
|---|---|---|
| CN | 102739401 A | 10/2012 |
| CN | 102831362 A | 12/2012 |
| CN | 102932140 A | 2/2013 |
| CN | 103117855 A | 5/2013 |
| CN | 103248491 A | 8/2013 |
| CN | 103269271 A | 8/2013 |

* cited by examiner

METHOD AND SYSTEM FOR BACKING UP PRIVATE KEY OF ELECTRONIC SIGNATURE TOKEN

CROSS-REFERENCE TO RELATED APPLICATIONS

The present application is a U.S. national phase application of International Application No. PCT/CN2014/075749, filed with the State Intellectual Property Office of P. R. China on Apr. 18, 2014, which is based upon and claims priority to Chinese Patent Application No. 201310194259.X, filed on May 23, 2013. Each of the above-mentioned applications is incorporated herein by reference in its entirety.

FIELD

The present disclosure relates to electronic technology field, and more particularly to a method and a system for backing up a private key of an electronic signature token.

BACKGROUND

In the related art, an electronic signature token stores a user's private key and digital certificate, and authenticates the user's identity using a built-in public key algorithm. Ideally, the user's private key in the electronic signature token cannot be read using any methods, thus ensuring the security of the authentication of the user. However, once the electronic signature token is lost, it is impossible to obtain the original private key, and the user has to apply for a new electronic signature token, key information like the private key and serial number has to be re-distributed and obtained, and the user needs to update the electronic signature token, thus increasing the maintenance cost of the electronic signature token. Therefore, how to maintain the electronic signature token efficiently becomes an urgent problem.

SUMMARY

In order to solve at least the above problems, the present disclosure provides a method and a system for backing up a private key of an electronic signature token.

To achieve the above objectives, the technical solutions of the present disclosure are realized as follows.

A method for backing up a private key of an electronic signature token, including: sending by a first electronic signature token a private key backup request data packet, in which the private key backup request data packet includes a first signature, and the first signature is obtained by signing at least a first indication information using a CA private key, the first indication information recording a primary-backup relationship of the first electronic signature token; verifying by a second electronic signature token the first signature in the private key backup request data packet after receiving the private key backup request data packet; if the first signature passes verification, determining, according to the first indication information, whether the first electronic signature token has a primary-backup relationship with the second electronic signature token; if the first electronic signature token has a primary-backup relationship with the second electronic signature token, encrypting by the second electronic signature token a private key of the second electronic signature token to obtain an encrypted private key of the second electronic signature token; sending by the second electronic signature token a private key backup response data packet, in which the private key backup response data packet includes a second signature and the encrypted private key of the second electronic signature token, and the second signature is obtained by signing at least a second indication information using the CA private key, the second indication information recording a primary-backup relationship of the second electronic signature token; verifying by the first electronic signature token the second signature in the private key backup response data packet after receiving the private key backup response data packet; if the second signature passes verification, determining, according to the second indication information, whether the second electronic signature token has the primary-backup relationship with the first electronic signature token; and if the second electronic signature token has the primary-back relationship with the first electronic signature token, decrypting by the first electronic signature token the encrypted private key of the second electronic signature token in the private key backup response data packet to obtain the private key of the second electronic signature token.

In some embodiments, the first indication information includes a first identifier group, and the first identifier group includes an identifier of a primary electronic signature token corresponding to the first electronic signature token and an identifier of an electronic signature token having a primary-backup relationship with the primary electronic signature token; determining according to first indication information whether the first electronic signature token has the primary-backup relationship with the second electronic signature token includes: determining whether an identifier of the second electronic signature token is in the first identifier group.

In some embodiments, the first indication information includes an identifier of the first electronic signature token; determining according to the first indication information whether the first electronic signature token has a primary-backup relationship with the second electronic signature token includes: determining whether the identifier of the first electronic signature token is in a second identifier group pre-stored locally, in which the second identifier group includes an identifier of the second electronic signature token and an identifier of an electronic signature token having a primary-backup relationship with the second electronic signature token.

In some embodiments, verifying by the second electronic signature token the first signature in the private key backup request data packet includes: verifying by the second electronic signature token the first signature in the private key backup request data packet using a CA public key.

In some embodiments, sending by the first electronic signature token a private key backup request data packet includes: signing by the first electronic signature token the private key backup request data packet, and sending the signed private key backup request data packet; before verifying by the second electronic signature token the first signature in the private key backup request data packet, the method further includes: verifying by the second electronic signature token a signature of the signed private key backup request data packet, and if the signature of the signed private key backup request data packet passes verification, verifying by the second electronic signature token the first signature in the private key backup request data packet.

In some embodiments, sending by the second electronic signature token a private key backup response data packet includes: signing by the second electronic signature token the private key backup response data packet, and sending the signed private key backup response data packet; before verifying by the first electronic signature token the second signature in the private key backup response data packet, the method further includes: verifying by the first electronic signature token a signature of the signed private key backup response data packet, and if the signature of the signed private key backup response data packet passes verification, verifying by the first electronic signature token the second signature in the private key backup response data packet.

In some embodiments, encrypting by the second electronic signature token a private key of the second electronic signature token includes: obtaining by the second electronic signature token and the first electronic signature token a matching code; negotiating by the second electronic signature token and the first electronic signature token using the matching code, an encrypting strategy and a decrypting strategy corresponding to the encrypting strategy used for communication between the first electronic signature token and the second electronic signature token; encrypting by the second electronic signature token the private key of the second electronic signature token using the encrypting strategy to obtain the encrypted private key of the second electronic signature token; decrypting by the first electronic signature token the encrypted private key of the second electronic signature token in the private key backup response data packet to obtain the private key of the second electronic signature token includes: decrypting by the first electronic signature token the encrypted private key of the second electronic signature token using the decrypting strategy to obtain the private key of the second electronic signature token.

In some embodiments, negotiating by the second electronic signature token and the first electronic signature token using the matching code, an encrypting strategy and a decrypting strategy corresponding to the encrypting strategy used for communication between the first electronic signature token and the second electronic signature token, includes: sending by the first electronic signature token a code to be verified to the second electronic signature token, in which the code to be verified is the matching code obtained by the first electronic signature token; receiving by the second electronic signature token the code to be verified, and determining by the second electronic signature token whether the code to be verified is identical with the matching code obtained locally; if the code to be verified is identical with the matching code obtained locally, generating by the second electronic signature token the encrypting strategy and the decrypting strategy corresponding to the encrypting strategy used for communication between the first electronic signature token and the second electronic signature token; sending by the second electronic signature token the decrypting strategy to the first electronic signature token; and receiving by the first electronic signature token the decrypting strategy.

In some embodiments, negotiating by the second electronic signature token and the first electronic signature token using the matching code, an encrypting strategy and a decrypting strategy corresponding to the encrypting strategy used for communication between the first electronic signature token and the second electronic signature token, includes: obtaining by the second electronic signature token and the first electronic signature token a correspondence relationship among matching modes, encrypting strategies and decrypting strategies; searching for the encrypting strategy and the decrypting strategy corresponding to the matching code by the second electronic signature token and the first electronic signature token according to the correspondence relationship; and if the encrypting strategy and the decrypting strategy are found, taking the encrypting strategy and the decrypting strategy found as the encrypting strategy and the decrypting strategy corresponding to the encrypting strategy used for communication between the first electronic signature token and the second electronic signature token.

In some embodiments, encrypting by the second electronic signature token the private key of the second electronic signature token includes: obtaining by the second electronic signature token a first secret key, and encrypting by the second electronic signature token the private key of the second electronic signature token using the first secret key to obtain the encrypted private key of the second electronic signature token, in which the first secret key is matched with a second secret key stored in the first electronic signature token; decrypting by the first electronic signature token the encrypted private key of the second electronic signature token in the private key backup response data packet includes: obtaining by the first electronic signature token the second secret key locally, and decrypting the encrypted private key of the second electronic signature token using the second secret key.

A system for backing up a private key of an electronic signature token, including a first electronic signature token and a second electronic signature token, in which the first electronic signature token includes a first sending module, a second verification module, a second determining module and a decrypting module, the second electronic signature token comprises a first verification module, a first determining module, an encrypting module and a second sending module. The first sending module is configured to send a private key backup request data packet, in which the private key request data packet includes a first signature, and the first signature is obtained by signing at least a first indication information using a CA private key, the first indication information recording a primary-backup relationship of the first electronic signature token. The first verification module is configured to verify the first signature in the private key backup request data packet after receiving the private key backup request data packet. The first determining module is configured to determine according to the first indication information whether the first electronic signature token has a primary-backup relationship with the second electronic signature token, if the first signature passes verification. The encrypting module is configured to, encrypt a private key of the second electronic signature token to obtain an encrypted private key of the second electronic signature token, if the first electronic signature token has a primary-backup relationship with the second electronic signature token. The second sending module is configured to send a private key backup response data packet, in which the private key backup response data packet includes a second signature and the encrypted private key of the second electronic signature token, and the second signature is obtained by signing at least a second indication information using the CA private key, the second indication information recording a primary-backup relationship of the second electronic signature token. The second verification module is configured to verify the second signature in the private key backup response data packet after receiving the private key backup response data packet. The second determining module is configured to determine according to the second indication information whether the second electronic signature token has the primary-backup relationship with the first electronic signature token, if the second signature passes verification. The decrypting module is configured to decrypt the encrypted private key of the second electronic signature token to obtain the private key of the second electronic signature token, if the second electronic signature token has the primary-backup relationship with the first electronic signature token.

In some embodiments, the first indication information includes a first identifier group, and the first identifier group includes an identifier of a primary electronic signature token corresponding to the first electronic signature token and an identifier of an electronic signature token having a primary-backup relationship with the primary electronic signature token; and the first determining module is configured to determine whether an identifier of the second electronic signature token is in the first identifier group.

In some embodiments, the first indication information includes an identifier of the first electronic signature token; and the first determining module is configured to determine whether the identifier of the first electronic signature token is in a second identifier group pre-stored locally, in which the second identifier group includes an identifier of the second electronic signature token and an identifier of an electronic signature token having a primary-backup relationship with the second electronic signature token.

In some embodiments, the first verification module is configured to verify the first signature in the private key backup request data packet using a CA public key.

In some embodiments, the first sending module is configured to sign the private key backup request data packet, and to send the signed private key backup request data packet; the second electronic signature token further includes a third verification module, and the third verification module is configured to verify a signature of the signed private key backup request data packet, in which, if the signature of the signed private key backup request data packet passes verification, the first verification module in the second electronic signature token verifies the first signature in the private key backup request data packet.

In some embodiments, the second sending module is configured to sign the private key backup response data packet, and to send the signed private key backup response data packet; and the first electronic signature token further includes a fourth verification module, and the fourth verification module is configured to verify a signature of the signed private key backup response data packet, in which, if the signature of the signed private key backup response data packet passes verification, the second verification module in the first electronic signature token verifies the second signature in the private key backup response data packet.

In some embodiments, the first electronic signature token further includes a first negotiation module, and the second electronic signature token further includes a second negotiation module. Each of the first negotiation module and the second negotiation module is configured to obtain a matching code, and to negotiate an encrypting strategy and a decrypting strategy corresponding to the encrypting strategy used for communication between the first electronic signature token and the second electronic token by using the matching code. The encrypting module is configured to encrypt the private key of the second electronic signature token using the encrypting strategy to obtain the encrypted private key of the second electronic signature token; and the decrypting module is configured to decrypt the encrypted private key of the second electronic signature token using the decrypting strategy to obtain the private key of the second electronic signature token.

In some embodiments, the first negotiation module is configured to send a code to be verified to the second negotiation module, in which the code to be verified is the matching code obtained by the first electronic signature token; the second negotiation module is configured to determine whether the code to be verified is identical with the matching code obtained locally after obtaining the code to be verified, to generate the encrypting strategy and the decrypting strategy corresponding to the encrypting strategy used for communication between the first electronic signature token and the second electronic signature token if the code to be verified is identical with the matching code obtained locally, and to send the decrypting strategy to the first negotiation module; and the first negotiation module is further configured to obtain the decrypting strategy.

In some embodiments, each of the first negotiation module and the second negotiation module is configured to obtain a correspondence relationship among matching codes, encrypting strategies and decrypting strategies, to search for the encrypting strategy and the decrypting strategy corresponding to the matching code according to the correspondence relationship; and to take the encrypting strategy and the decrypting strategy found as the encrypting strategy and the decrypting strategy corresponding to the encrypting strategy used for communication between the first electronic signature token and the second electronic signature token if the encrypting strategy and the decrypting strategy are found.

In some embodiments, the encrypting module is configured to obtain a first secret key, and to encrypt the private key of the second electronic signature token using the first secret key, so as to obtain the encrypted private key of the second electronic signature token, in which the first secret key is matched with a second secret key stored in the first electronic signature token; and the decrypting module is configured to obtain the second secret key locally, and to decrypt the encrypted private key of the second electronic signature token using the second secret key.

Compared to the related art, the technical solutions of the present disclosure at least have following benefits. When receiving the private key backup request data packet, the second electronic signature token verifies the first signature to determine whether the first electronic signature token is legal, and then determines whether the identifier of one of the second electronic signature token and the first electronic signature token is within the identifier group of the other one of the second electronic signature token and the first electronic signature token so as to determine whether the first electronic signature token and the second electronic signature token have a primary-backup relationship. Once both the above conditions are satisfied, the second electronic signature token encrypts the private key of the second electronic signature token, and sends out the encrypted private key of the second electronic signature token via the private key backup response data packet. After receiving the private key backup response data packet, the first electronic signature token verifies the second signature to determine whether the second electronic signature token is legal, and then determines whether the identifier of one of the second electronic signature token and the first electronic signature token is within the identifier group of the other one of the second electronic signature token and the first electronic signature token so as to determine whether the second electronic signature token and the first electronic signature token have a primary-backup relationship. Once both the above conditions are satisfied, the first electronic signature token decrypts the encrypted private key of the second electronic signature token to obtain the private key of the second electronic signature token, thus completing the backup of the private key. By determining whether the first electronic signature token and the second electronic signature token are legal and whether there is a primary-backup relationship between the first electronic signature token and the second electronic signature token, and transmitting the private key under the premise of safety, the safe backup of the private key is achieved.

BRIEF DESCRIPTION OF THE DRAWINGS

In order to make technique solutions according to embodiments of the present disclosure more apparent, drawings needed to be used in descriptions of the embodiments will be illustrated in the following. Obviously, the drawings to be illustrated in the following only represent some embodiments of the present disclosure, and other drawings can be obtained according these drawings by those having ordinary skills in the related art without making creative labors.

DETAILED DESCRIPTION

The technique solution in embodiments of the present disclosure will be described in the following with reference to drawings in the embodiments of the present disclosure. Obviously, the embodiments to be described only are some embodiments of the present disclosure, instead of all the embodiments thereof. Based on embodiments of the present disclosure, other embodiments obtained by those having ordinary skills in the related art without making creative labors fall into a protection scope of the present disclosure.

In the description of the present disclosure, it is to be understood that relative terms such as "central", "longitudinal", "lateral", "up", "down", "front", "rear", "right", "left", "vertical", "horizontal", "bottom", "top", "inner", "outer" as well as derivative thereof should be construed to refer to the orientation as then described or as shown in the drawings under discussion for simplifying the description of the present disclosure, but do not alone indicate or imply that the device or element referred to must have a particular orientation. Moreover, it is not required that the present disclosure is constructed or operated in a particular orientation, and thus embodiments of the present disclosure are not limited to these. In addition, terms such as "first" and "second" are used herein for purposes of description and are not intended to indicate or imply relative importance or significance.

In the description of the present disclosure, unless specified or limited otherwise, it should be noted that, terms "mounted," "connected" and "coupled" may be understood broadly, such as permanent connection or detachable connection, electronic connection or mechanical connection, direct connection or indirect connection via intermediary, inner communication or interaction between two elements. These having ordinary skills in the art should understand the specific meanings in the present disclosure according to specific situations.

In the following, embodiments of the present disclosure will be further described in detail with reference to drawings.

Figure 1:
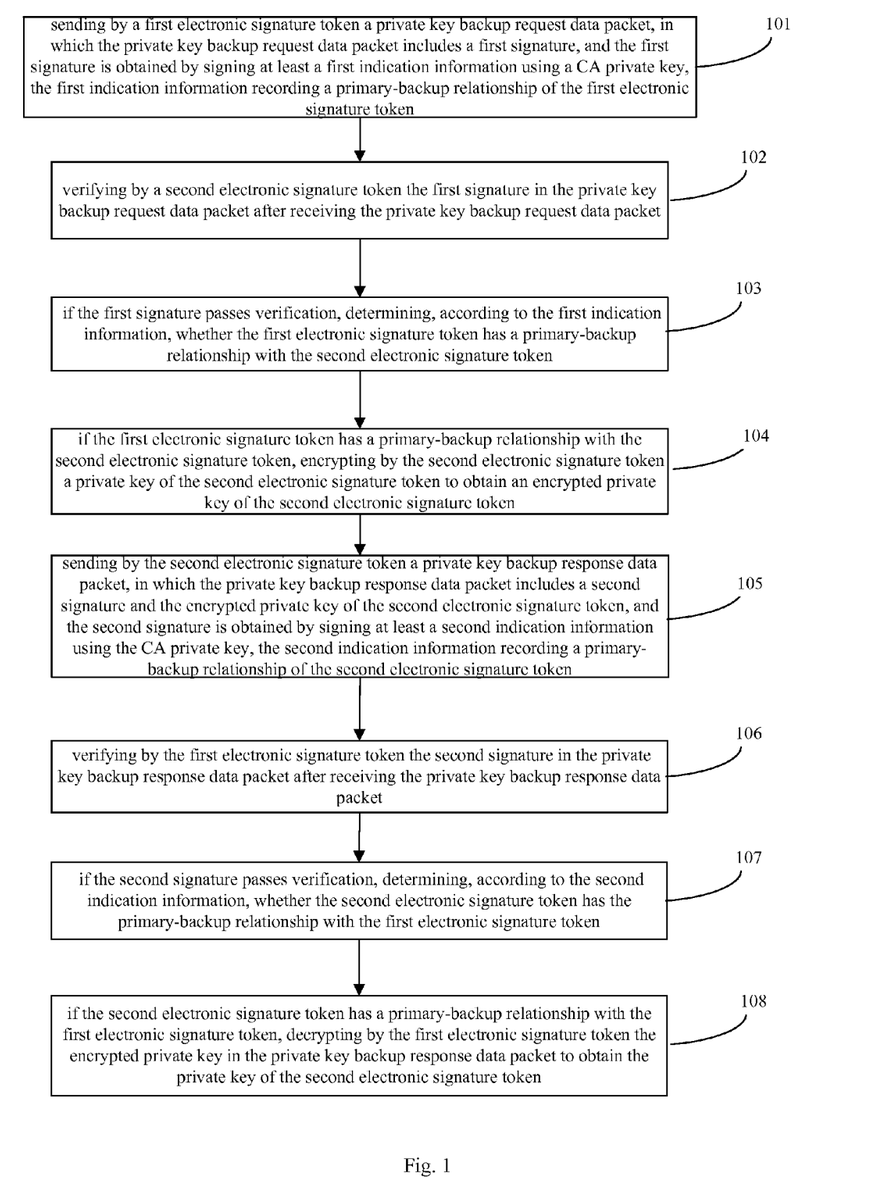
FIG. 1 is a flow chart of a method for backing up a private key of an electronic signature token according to an embodiment of the present disclosure.

FIG. 1 is a flow chart of a method for backing up a private key of an electronic signature token according to an embodiment of the present disclosure. The method embodiment shown in FIG. 1 includes following steps.

In step 101, a first electronic signature token sends a private key backup request data packet, in which the private key backup request data packet includes a first signature, the first signature is obtained by signing at least a first indication information using a CA private key, and the first indication information records a primary-backup relationship of the first electronic signature token.

In step 102, a second electronic signature token verifies the first signature in the private key backup request data packet after receiving the private key backup request data packet.

In an embodiment, the second electronic signature token verifies the first signature in the private key backup request data packet using a CA public key.

In step 103, if the first signature passes verification, the second electronic signature token determines according to the first indication information, whether the first electronic signature token has a primary-backup relationship with the second electronic signature token.

Specifically, the first indication information includes a first identifier group, in which the first identifier group includes an identifier of a primary electronic signature token corresponding to the first electronic signature token and an identifier of an electronic signature token having a primary-backup relationship with the primary electronic signature token.

Determining according to first indication information whether the first electronic signature token has the primary-backup relationship with the second electronic signature token includes: determining whether an identifier of the second electronic signature token is in the first identifier group.

Alternatively, the first indication information includes an identifier of the first electronic signature token, and determining according to the first indication information whether the first electronic signature token has a primary-backup relationship with the second electronic signature token includes: determining whether the identifier of the first electronic signature token is in a second identifier group pre-stored locally, in which the second identifier group includes an identifier of the second electronic signature token and an identifier of an electronic signature token having a primary-backup relationship with the second electronic signature token.

In step 104, if the first electronic signature token has a primary-backup relationship with the second electronic signature token, the second electronic signature token encrypts a private key of the second electronic signature token to obtain an encrypted private key of the second electronic signature token.

In step 105, the second electronic signature token sends a private key backup response data packet, in which the private key backup response data packet includes a second signature and the encrypted private key of the second electronic signature token, the second signature is obtained by signing at least a second indication information using the CA private key, and the second indication information records a primary-backup relationship of the second electronic signature token.

In step 106, the first electronic signature token verifies the second signature in the private key backup response data packet after receiving the private key backup response data packet.

In an embodiment, the first electronic signature token verifies the second signature in the private key backup response data packet using a CA public key.

In step 107, if the second signature passes verification, the first electronic signature token determines according to the second indication information, whether the second electronic signature token has the primary-backup relationship with the first electronic signature token.

Specifically, the second indication information includes a second identifier group of the second electronic signature token, in which the second identifier group includes an identifier of the second electronic signature token and an identifier of an electronic signature token having a primary-backup relationship with the second electronic signature token.

Determining according to the second indication information whether the second electronic signature token has a primary-backup relationship with the first electronic signature token includes: determining whether the identifier of the first electronic signature token is in the second identifier group.

Alternatively, the second indication information includes an identifier of the second electronic signature token, and determining according to the second indication information whether the second electronic signature token has the primary-backup relationship with the first electronic signature token includes: determining whether the identifier of the second electronic signature token is in the first identifier group.

In step 108, if the second electronic signature token has the primary-backup relationship with the first electronic signature token, the first electronic signature token decrypts the encrypted private key in the private key backup response data packet to obtain the private key of the second electronic signature token.

Compared to the related art, the technical solutions of the present disclosure at least have following benefits. When receiving the private key backup request data packet, the second electronic signature token verifies the first signature to determine whether the first electronic signature token is legal, and then determines whether the identifier of one of the second electronic signature token and the first electronic signature token is within the identifier group of the other one of the second electronic signature token and the first electronic signature token so as to determine whether the first electronic signature token and the second electronic signature token have a primary-backup relationship. Once both the above conditions are satisfied, the second electronic signature token encrypts the private key of the second electronic signature token, and sends out the encrypted private key of the second electronic signature token via the private key backup response data packet. After receiving the private key backup response data packet, the first electronic signature token verifies the second signature to determine whether the second electronic signature token is legal, and then determines whether the identifier of one of the second electronic signature token and the first electronic signature token is within the identifier group of the other one of the second electronic signature token and the first electronic signature token so as to determine whether the second electronic signature token and the first electronic signature token have a primary-backup relationship. Once both the above conditions are satisfied, the first electronic signature token decrypts the encrypted private key of the second electronic signature token to obtain the private key of the second electronic signature token, thus accomplishing the backup of the private key. By determining whether the first electronic signature token and the second electronic signature token are legal and whether there is a primary-backup relationship between the first electronic signature token and the second electronic signature token, and transmitting the private key under the premise of safety, the safe backup of the private key is achieved.

Further description of embodiments of the present disclosure is provided as follows.

In order to avoid a problem that a legal electronic signature token obtains the first signature, pretends to the first electronic signature token, and steals the private key of the second electronic signature token, which leads to risk of revealing the private key, following operations are performed.

When the first electronic signature token sends the private key backup request data packet, the first electronic signature token first signs the private key backup request data packet, and then sends the signed private key backup request data packet.

Then, before verifying the first signature in the private key backup request data packet, the second electronic signature token verifies the signature of the signed private key backup request data packet. If the signature of the signed private key request data packet passes verification, the second electronic signature token verifies the first signature in the private key backup request data packet.

It can be seen from above that, by signing the private key backup request data packet by the first electronic signature token, and verifying by the second electronic signature token the private key backup request data packet, the identity of the first electronic signature token requesting for backup may be authenticated. In this way, the electronic signature token having the first signature cannot steal the private key of the second electronic signature token, thus improving the security of backing up the private key.

In an embodiment, the private key used by signing the private key backup request data packet and the public key used by the second electronic signature token for verifying the signed private key backup request data packet are negotiated in advance, and then written into the first electronic signature token and the second electronic signature token.

Similarly, in order to avoid a problem that a legal electronic signature token obtains the second signature, pretends to be the second electronic signature token, and sends a wrong private key to the first electronic signature token, which leads to failure of backing up the private key, following operations are performed.

When the second electronic signature token sends the private key backup response data packet, the second electronic signature token first signs the private key backup response data packet, and then sends the signed private key backup response data packet.

Then, before verifying the second signature in the private key backup response data packet, the first electronic signature token verifies the signature of the signed private key backup response data packet. If the signature of the signed private key backup response data packet passes verification, the first electronic signature token verifies a digital signature in the private key backup response data packet.

It can be seen from above that, by signing the private key backup response data packet by the second electronic signature token, and verifying by the first electronic signature token the private key backup response data packet, the identity of the first electronic signature token initiating the backup response may be authenticated. In this way, the legal electronic signature token having the second signature cannot prevent the first electronic signature token from obtaining the correct private key, thus ensuring that the first electronic signature token may backup the correct private key.

In an embodiment, the private key used by signing the private key backup request data packet and the public key used by the second electronic signature token for verifying the private key backup request data packet are negotiated in advance, and then written into the first electronic signature token and the second electronic signature token.

The second electronic signature token may encrypt the private key of the second electronic signature token in following two ways.

Way 1: the second electronic signature token and the first electronic signature token obtains a matching code, and negotiates using the matching code, an encrypting strategy and a decrypting strategy corresponding to the encrypting strategy used for communication between the first electronic signature token and the second electronic signature token. Then, the second electronic signature token encrypts the private key of the second electronic signature token using the encrypting strategy to obtain the encrypted private key of the second electronic signature token.

Accordingly, the first electronic signature token decrypts the encrypted private key in the private key backup response data packet using the decrypting strategy obtained by negotiation, so as to obtain the private key.

Way 2: the second electronic signature token obtains a first secret key, in which the first secret key is matched with a second secret key stored in the first electronic signature token. Then, the second electronic signature token encrypts the private key of the second electronic signature token using the first secret key, so as to obtain the encrypted private key of the second electronic signature token.

Accordingly, when the first electronic signature token decrypts the encrypted private key in the private key backup response data packet, the first electronic signature token obtains the second secret key locally, and decrypts the encrypted private key of the second electronic signature token using the second secret key so as to obtain the private key The second electronic signature token may obtain the first secret key by querying the first electronic signature token, or from a bank background server.

In Way 2, if the first secret key and the second secret key are a pair of asymmetrical secret keys, then the first secret key is the public key of the first electronic signature token, the second secret key is the private key of the first electronic signature token, the first secret key is stored in the digital certificate of the first electronic signature token, and the second electronic signature token obtains the first secret key from the digital certificate of the first electronic signature token; if the first secret key and the second secret key are a pair of symmetrical secret keys, then the first secret key is identical with the second secret key.

It can be seen from above that, in Way 1, the encrypting strategy and the decrypting strategy are determined by negotiating through the matching code, thus improving the randomness of the encrypting strategy and the decrypting strategy; in Way 2, the secret key in the first electronic signature token is used, such that the first electronic signature token may obtain the decrypting strategy conveniently, which is simple to implement.

In the following, further description of Way 1 will be provided.

The second electronic signature token may generate the matching code according to a pre-stored matching code generation strategy and output the matching code, in which the matching code may include at least one of texts, numbers and characters. Certainly, the first electronic signature token may obtain the matching code in many ways, e.g. by wireless or wired transmission, or by manual input of the user. Certainly, the bank background server may send the matching code to the second electronic signature token and the first electronic signature token, such that the first electronic signature token and the second electronic signature token obtain the matching code.

In the method of generating by the second electronic signature token the matching code and then obtaining by the first electronic signature token the matching code, there is no need for a bank background server to send the matching code, and thus the interaction process is simple, compared to the method of sending the matching code by the bank background server.

The encrypting strategy and the decrypting strategy may be negotiated using the matching code in following two ways.

Way A1: the first electronic signature token sends a code to be verified to the second electronic signature token, in which the code to be verified is the matching code obtained by the first electronic signature token. After obtaining the code to be verified, the second electronic signature token determines whether the code to be verified is identical with the matching code obtained locally, and if the code to be verified is identical with the matching code obtained locally, the second electronic signature token generates the encrypting strategy and the decrypting strategy corresponding to the encrypting strategy used for communication between the first electronic signature token and the second electronic signature token, and sends the decrypting strategy to the first electronic signature token.

It can be seen from above that, in way A1, the second electronic signature token determines whether the supposed first electronic signature token initiating negotiation with the second electronic signature token about the encrypting strategy and the decrypting strategy is the first electronic signature token by comparing the code to be verified with the matching code obtained locally, thus authenticating the identity of the first electronic signature token. Once determining that the supposed first electronic signature token is the first electronic signature token, the decrypting algorithm is sent to the first electronic signature token, thus ensuring the safety of transmitting the private key.

In way A1, in order to prevent other electronic signature tokens from obtaining the encrypting strategy of the private key, the first electronic signature token performs following operations for sending the code to be verified to the second electronic signature token.

The first electronic signature token signs the code to be verified, and sends the signed code to be verified to the second electronic signature token.

Accordingly, before determining whether the code to be verified is identical with the matching code obtained locally, the second electronic signature token further performs following operation.

The second electronic signature token verifies the signed code to be verified, and if the verification is successful, the second electronic signature token determines whether the code to be verified is identical with the matching code obtained locally.

In an embodiment, the private key used by the first electronic signature token for signing the code to be verified may be identical with the private key used by the first electronic signature token for signing the private key backup request data packet. Similarly, the public key used by the second electronic signature token for verifying the signed code to be verified is identical with the public key used for verifying the signed private key backup request data packet.

In order to prevent other electronic signature tokens from pretending to be the second electronic signature token and sending the wrong decrypting algorithm to the first electronic signature token, the second electronic signature token performs following operation for sending the decrypting strategy to the first electronic signature token.

The second electronic signature token signs the decrypting strategy, and sends the signed decrypting strategy to the first electronic signature token.

Accordingly, before obtaining the decrypting strategy, the first electronic signature token further performs following operation.

The first electronic signature token verifies the signed decrypting strategy, and if the verification is successful, the first electronic signature token obtains the decrypting strategy.

In an embodiment, the private key used by the second electronic signature token for signing the decrypting strategy may be identical with the private key used by the second electronic signature token for signing the private key backup response data packet. Similarly, the public key used by the first electronic signature token for verifying the signed decrypting strategy is identical with the public key used for verifying the signed private key backup response data packet.

In way A2: the second electronic signature token and the first electronic signature token obtain a correspondence relationship among matching modes, encrypting strategies and decrypting strategies, search for the encrypting strategy and the decrypting strategy corresponding to the matching code according to the correspondence relationship, and if the encrypting strategy and the decrypting strategy are found, takes the encrypting strategy and the decrypting strategy found as the encrypting strategy and the decrypting strategy corresponding to the encrypting strategy used for communication between the first electronic signature token and the second electronic signature token.

In way A2, the second electronic signature token and the first electronic signature token determine the encrypting strategy and the decrypting strategy used in the communication between the second electronic signature token and the first electronic signature token by searching the correspondence relationship obtained locally, which is simple to implement, and does not require information interaction between the second electronic signature token and the first electronic signature token, thus reducing the risk of information leakage.

With both the above ways, it may randomly choose the encrypting strategy and the decrypting strategy according to the matching code, thus improving the randomness of the encrypting, and ensuring the communication safety.

In conclusion, in the present disclosure, the first electronic signature token pre-stores the private key used for signing the content during communication with the second electronic signature token, the public key used for verifying the signed content and sent by the second electronic signature token, and a pair of secret keys used for encrypting and decrypting content in itself. The second electronic signature token pre-stores the private key used for signing the content during communication with the first electronic signature token, the public key used for verifying the signed content and sent by the first electronic signature token, and the private key requested by the first electronic signature token for backing up.

Figure 2:
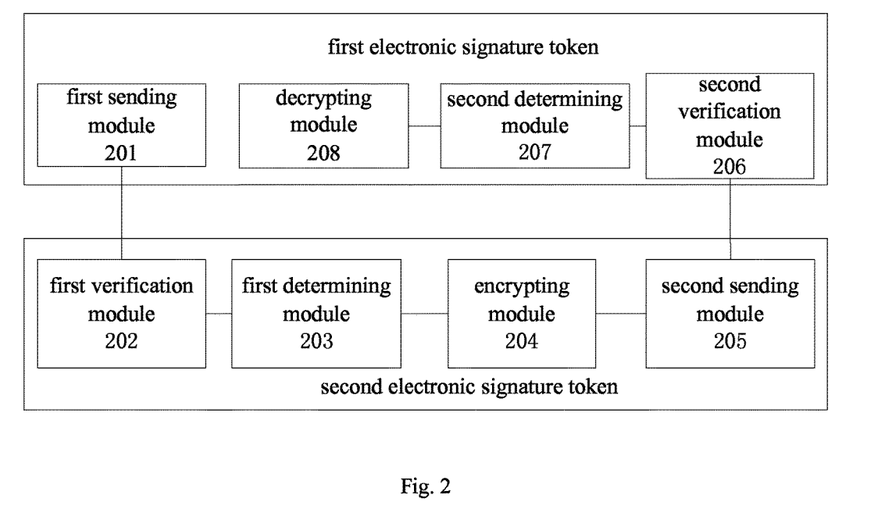
FIG. 2 is a block diagram of a system for backing up a private key of an electronic signature token according to an embodiment of the present disclosure.

FIG. 2 is a block diagram of a system for backing up a private key of an electronic signature token according to an embodiment of the present disclosure. The system shown in FIG. 2 includes a first electronic signature token and a second electronic signature token, in which the first electronic signature token includes a first sending module 201, a second verification module 206, a second determining module 207 and a decrypting module 208, the second electronic signature token includes a first verification module 202, a first determining module 203, an encrypting module 204 and a second sending module 205.

The first sending module 201 is configured to send a private key backup request data packet, in which the private key request data packet includes a first signature, and the first signature is obtained by signing at least a first indication information using a CA private key, the first indication information recording a primary-backup relationship of the first electronic signature token.

The first verification module 202 is configured to verify the first signature in the private key backup request data packet after receiving the private key backup request data packet.

The first determining module 203 is configured to determine according to the first indication information whether the first electronic signature token has a primary-backup relationship with the second electronic signature token, if the first signature passes verification.

The encrypting module 204 is configured to encrypt a private key of the second electronic signature token to obtain an encrypted private key of the second electronic signature token, if the first electronic signature token has a primary-backup relationship with the second electronic signature token.

The second sending module 205 is configured to send a private key backup response data packet, in which the private key backup response data packet includes a second signature and the encrypted private key of the second electronic signature token, and the second signature is obtained by signing at least a second indication information using the CA private key, the second indication information recording a primary-backup relationship of the second electronic signature token.

The second verification module 206 is configured to verify the second signature in the private key backup response data packet after receiving the private key backup response data packet.

The second determining module 207 is configured to determine according to the second indication information whether the second electronic signature token has the primary-backup relationship with the first electronic signature token, if the second signature passes verification.

The decrypting module 208 is configured to decrypt the encrypted private key of the second electronic signature token to obtain the private key of the second electronic signature token, if the second electronic signature token has the primary-backup relationship with the first electronic signature token.

In some embodiments, the first indication information includes a first identifier group, and the first identifier group includes an identifier of a primary electronic signature token corresponding to the first electronic signature token and an identifier of an electronic signature token having a primary-backup relationship with the primary electronic signature token.

The first determining module is configured to determine whether an identifier of the second electronic signature token is in the first identifier group.

In some embodiments, the first indication information includes an identifier of the first electronic signature token.

The first determining module is configured to determine whether the identifier of the first electronic signature token is in a second identifier group pre-stored locally, in which the second identifier group includes an identifier of the second electronic signature token and an identifier of an electronic signature token having a primary-backup relationship with the second electronic signature token.

In some embodiments, the first verification module is configured to verify the first signature in the private key backup request data packet using a CA public key.

In some embodiments, the first sending module is configured to sign the private key backup request data packet, and send the signed private key backup request data packet.

The second electronic signature token may further include a third verification module.

The third verification module is configured to verify a signature of the signed private key backup request data packet, and if the signature of the signed private key backup request data packet passes verification, the first verification module in the second electronic signature token verifies the first signature in the private key backup request data packet.

In some embodiments, the second sending module is configured to sign the private key backup response data packet, and send the signed private key backup response data packet.

The first electronic signature token may further include a fourth verification module.

The fourth verification module is configured to verify a signature of the signed private key backup response data packet, and if the signature of the signed private key backup response data packet passes verification, the second verification module in the first electronic signature token verifies the second signature in the private key backup response data packet.

In some embodiments, the first electronic signature token further includes a first negotiation module, and the second electronic signature token further includes a second negotiation module. Each of the first negotiation module and the second negotiation module is configured to obtain a matching code, and to negotiate an encrypting strategy and a decrypting strategy corresponding to the encrypting strategy used for communication between the first electronic signature token and the second electronic token by using the matching code.

Accordingly, the encrypting module is configured to encrypt the private key using the encrypting strategy to obtain the encrypted private key.

The decrypting module is configured to decrypt the encrypted private key of using the decrypting strategy to obtain the private key.

In some embodiments, the first negotiation module is configured to send a code to be verified to the second electronic signature token, in which the code to be verified is the matching code obtained by the first electronic signature token.

The second negotiation module is configured to determine whether the code to be verified is identical with the matching code obtained locally after obtaining the code to be verified, and if yes, to generate the encrypting strategy and the decrypting strategy corresponding to the encrypting strategy used for communication between the first electronic signature token and the second electronic signature token, such that the first negotiation module obtains the decrypting strategy.

In some embodiments, each of the first negotiation module and the second negotiation module is configured to obtain a correspondence relationship among matching codes, encrypting strategies and decrypting strategies, to search for the encrypting strategy and the decrypting strategy corresponding to the matching code according to the correspondence relationship, and if the encrypting strategy and the decrypting strategy are found, to take the encrypting strategy and the decrypting strategy found as the encrypting strategy and the decrypting strategy corresponding to the encrypting strategy used for communication between the first electronic signature token and the second electronic signature token.

In some embodiments, the encrypting module is configured to obtain a first secret key, and to encrypt the private key of the second electronic signature token using the first secret key, so as to obtain the encrypted private key of the second electronic signature token, in which the first secret key is matched with a second secret key stored in the first electronic signature token.

The decrypting module is configured to obtain the second secret key locally, and to decrypt the encrypted private key of the second electronic signature token using the second secret key.

In some embodiments, if the first secret key and the second secret key are a pair of asymmetrical secret keys, then the first secret key is the public key of the first electronic signature token, the second secret key is the private key of the first electronic signature token, the first secret key is stored in the digital certificate of the first electronic signature token, and the second electronic signature token obtains the first secret key from the digital certificate of the first electronic signature token; if the first secret key and the second secret key are a pair of symmetrical secret keys, then the first secret key is identical with the second secret key.

Compared to the related art, the technical solutions of the present disclosure at least have following benefits. When receiving the private key backup request data packet, the second electronic signature token verifies the first signature to determine whether the first electronic signature token is legal, and then determines whether the identifier of one of the second electronic signature token and the first electronic signature token is within the identifier group of the other one of the second electronic signature token and the first electronic signature token so as to determine whether the first electronic signature token and the second electronic signature token have a primary-backup relationship. Once both the above conditions are satisfied, the second electronic signature token encrypts the private key of the second electronic signature token, and sends out the encrypted private key of the second electronic signature token via the private key backup response data packet. After receiving the private key backup response data packet, the first electronic signature token verifies the second signature to determine whether the second electronic signature token is legal, and then determines whether the identifier of one of the second electronic signature token and the first electronic signature token is within the identifier group of the other one of the second electronic signature token and the first electronic signature token so as to determine whether the second electronic signature token and the first electronic signature token have a primary-backup relationship. Once both the above conditions are satisfied, the first electronic signature token decrypts the encrypted private key of the second electronic signature token to obtain the private key of the second electronic signature token, thus completing the backup of the private key. By determining whether the first electronic signature token and the second electronic signature token are legal and whether there is a primary-backup relationship between the first electronic signature token and the second electronic signature token, and transmitting the private key under the premise of safety, the safe backup of the private key is achieved.

Any process or method described in a flow chart or described herein in other ways may be understood to include one or more modules, segments or portions of codes of executable instructions for achieving specific logical functions or steps in the process, and the scope of a preferred embodiment of the present disclosure includes other implementations, which should be understood by those skilled in the art.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs comprise one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks, CD, etc.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A method for backing up a private key of an electronic signature token, comprising:
    sending by a first electronic signature token a private key backup request data packet, wherein the private key backup request data packet comprises a first signature, and the first signature is obtained by signing at least a first indication information using a CA private key, the first indication information recording a primary-backup relationship of the first electronic signature token;
    verifying by a second electronic signature token the first signature in the private key backup request data packet after receiving the private key backup request data packet;
    when the first signature passes verification, determining, according to the first indication information, whether the first electronic signature token has a primary-backup relationship with the second electronic signature token;
    when the first electronic signature token has a primary-backup relationship with the second electronic signature token;
        obtaining a local matching code by the second electronic signature token and a to-be-verified matching code by the first electronic signature token;
        sending by the first electronic signature token the to-be-verified matching code to the second electronic signature token;
        determining by the second electronic signature token whether the to-be-verified matching code is identical with the local matching code;
        if the to-be-verified matching code is identical with the local matching code, generating by the second electronic signature token the encrypting strategy and the decrypting strategy corresponding to the encrypting strategy used for communication between the first electronic signature token and the second electronic signature token;
        sending by the second electronic signature token the decrypting strategy to the first electronic signature token; and
        obtaining by the first electronic signature token the decrypting strategy;
    encrypting by the second electronic signature token a private key of the second electronic signature token using the encrypting strategy to obtain an encrypted private key of the second electronic signature token;
    sending by the second electronic signature token a private key backup response data packet, wherein the private key backup response data packet comprises a second signature and the encrypted private key of the second electronic signature token, and the second signature is obtained by signing at least a second indication information using the CA private key, the second indication information recording a primary-backup relationship of the second electronic signature token;
    verifying by the first electronic signature token the second signature in the private key backup response data packet after receiving the private key backup response data packet;
    when the second signature passes verification, determining, according to the second indication information, whether the second electronic signature token has the primary-backup relationship with the first electronic signature token; and when the second electronic signature token has the primary-backup relationship with the first electronic signature token, decrypting by the first electronic signature token the encrypted private key of the second electronic signature token using the decrypting strategy to obtain the private key of the second electronic signature token.

2. The method according to claim 1, wherein
the first indication information comprises a first identifier group, and the first identifier group comprises an identifier of a primary electronic signature token corresponding to the first electronic signature token and an identifier of an electronic signature token having a primary-backup relationship with the primary electronic signature token;
determining according to first indication information whether the first electronic signature token has the primary-backup relationship with the second electronic signature token comprises:
determining whether an identifier of the second electronic signature token is in the first identifier group.

3. The method according to claim 1, wherein
the first indication information comprises an identifier of the first electronic signature token;
determining according to the first indication information whether the first electronic signature token has a primary-backup relationship with the second electronic signature token comprises:
determining whether the identifier of the first electronic signature token is in a second identifier group pre-stored locally, in which the second identifier group comprises an identifier of the second electronic signature token and an identifier of an electronic signature token having a primary-backup relationship with the second electronic signature token.

4. The method according to claim 1, wherein verifying by the second electronic signature token the first signature in the private key backup request data packet comprises:
verifying by the second electronic signature token the first signature in the private key backup request data packet using a CA public key.

5. The method according to claim 1, wherein
sending by the first electronic signature token a private key backup request data packet comprises:
signing by the first electronic signature token the private key backup request data packet, and sending the signed private key backup request data packet;
before verifying by the second electronic signature token the first signature in the private key backup request data packet, the method further comprises:
verifying by the second electronic signature token a signature of the signed private key backup request data packet, and if the signature of the signed private key backup request data packet passes verification, verifying by the second electronic signature token the first signature in the private key backup request data packet.

6. The method according to claim 1, wherein
sending by the second electronic signature token a private key backup response data packet comprises:
signing by the second electronic signature token the private key backup response data packet, and sending the signed private key backup response data packet;

before verifying by the first electronic signature token the second signature in the private key backup response data packet, the method further comprises:
verifying by the first electronic signature token a signature of the signed private key backup response data packet, and if the signature of the signed private key backup response data packet passes verification, verifying by the first electronic signature token the second signature in the private key backup response data packet.

7. The method according to claim 1, wherein
encrypting by the second electronic signature token the private key of the second electronic signature token comprises:
obtaining by the second electronic signature token a first secret key, and encrypting by the second electronic signature token the private key of the second electronic signature token using the first secret key to obtain the encrypted private key of the second electronic signature token, in which the first secret key is matched with a second secret key stored in the first electronic signature token;
decrypting by the first electronic signature token the encrypted private key of the second electronic signature token in the private key backup response data packet comprises:
obtaining by the first electronic signature token the second secret key locally, and decrypting the encrypted private key of the second electronic signature token using the second secret key.

8. A method for backing up a private key of an electronic signature token, comprising:
sending by a first electronic signature token a private key backup request data packet, wherein the private key backup request data packet comprises a first signature, and the first signature is obtained by signing at least a first indication information using a CA private key, the first indication information recording a primary-backup relationship of the first electronic signature token;
verifying by a second electronic signature token the first signature in the private key backup request data packet after receiving the private key backup request data packet;
when the first signature passes verification, determining, according to the first indication information, whether the first electronic signature token has a primary-backup relationship with the second electronic signature token;
when the first electronic signature token has a primary-backup relationship with the second electronic signature token:
encrypting by the second electronic signature token a private key of the second electronic signature token comprises:
obtaining by the second electronic signature token and the first electronic signature token a matching code;
obtaining by the second electronic signature token and the first electronic signature token a correspondence relationship among matching codes, encrypting strategies and decrypting strategies;
searching for the encrypting strategy and the decrypting strategy corresponding to the matching code by the second electronic signature token and the first electronic signature token according to the correspondence relationship; and
if the encrypting strategy and the decrypting strategy are found, taking the encrypting strategy and the decrypting strategy found as the encrypting strategy and the decrypting strategy corresponding to the encrypting strategy used for communication between the first electronic signature token and the second electronic signature token;

encrypting by the second electronic signature token the private key of the second electronic signature token using the encrypting strategy to obtain the encrypted private key of the second electronic signature token;

sending by the second electronic signature token a private key backup response data packet wherein the private key backup response data packet comprises a second signature and the encrypted private key of the second electronic signature token, and the second signature is obtained by signing at least a second indication information using the CA private key, the second indication information recording a primary-backup relationship of the second electronic signature token;

verifying by the first electronic signature token the second signature in the private key backup response data packet after receiving the private key backup response data packet;

when the second signature passes verification, determining, according to the second indication information, whether the second electronic signature token has the primary-backup relationship with the first electronic signature token; and when the second electronic signature token has the primary-backup relationship with the first electronic signature token, decrypting by the first electronic signature token the encrypted private key of the second electronic signature token using the decrypting strategy to obtain the private key of the second electronic signature token.

9. A nontransitory computer readable medium stored there on a computer program comprising:

a first electronic signature token instructions that when executed by a processor of the first electronic signature token implement a first sending component, a second verification component, a second determining component where is the first, a decrypting component and a first negotiation component, and a second electronic signature token comprising second instructions that when executed by a processor of the second electronic signature token implement a first verification component, a first determining component, an encrypting component, a second sending component, and a second negotiation component, the first and second instructions implementing each of the first negotiation component and the second negotiation component including instructions to obtain a matching code, and negotiate an encrypting strategy and a decrypting strategy corresponding to the encrypting strategy used for communication between the first electronic signature token and the second electronic token by using the matching code, the first instruction for sending a code to be verified to the second negotiation component, in which the code to be verified is the matching code obtained by the first electronic signature token;

the second instruction determining whether the code to be verified is identical with the matching code obtained locally after obtaining the code to be verified, and to generate the encrypting strategy and the decrypting strategy corresponding to the encrypting strategy used for communication between the first electronic signature token and the second electronic signature token if the code to be verified is identical with the matching code obtained locally, and to send the decrypting strategy to the first negotiation component;

the first instruction sending a private key backup request data packet, in which the private key request data packet comprises a first signature, and the first signature is obtained by signing at least a first indication information using a CA private key, the first indication information recording a primary-backup relationship of the first electronic signature token;

the second instruction for verifying the first signature in the private key backup request data packet after receiving the private key backup request data packet;

the second instruction for determining according to the first indication information whether the first electronic signature token has a primary-backup relationship with the second electronic signature token, if the first signature passes verification;

the second instruction for encrypting a private key of the second electronic signature token using the encrypting strategy to obtain an encrypted private key of the second electronic signature token if the first electronic signature token has a primary-backup relationship with the second electronic signature token;

the second instruction for sending a private key backup response data packet, in which the private key backup response data packet comprises a second signature and the encrypted private key of the second electronic signature token, and the second signature is obtained by signing at least a second indication information using the CA private key, the second indication information recording a primary-backup relationship of the second electronic signature token;

the first instruction for verifying the second signature in the private key backup response data packet after receiving the private key backup response data packet;

the first instruction determining according to the second indication information whether the second electronic signature token has the primary-backup relationship with the first electronic signature token, if the second signature passes the verification; and the first instruction for decrypting the encrypted private key of the second electronic signature token in the private key backup response data packet using the decrypting strategy to obtain the private key of the second electronic signature token, if the second electronic signature token has the primary-backup relationship with the first electronic signature token.

10. A nontransitory computer readable medium stored there on a computer program according to claim 9, wherein the first indication information comprises a first identifier group, and the first identifier group comprises an identifier of a primary electronic signature token corresponding to the first electronic signature token and an identifier of an electronic signature token having a primary-backup relationship with the primary electronic signature token; and the second instructions implementing the first determining component including instructions to determine whether an identifier of the second electronic signature token is in the first identifier group.

11. A nontransitory computer readable medium stored there on a computer program according to claim 9, wherein the first indication information comprises an identifier of the first electronic signature token; and the second instructions implementing the first determining component including instructions to determine whether the identifier of the first electronic signature token is in a second identifier group pre-stored locally, in which the second identifier group comprises an identifier of the second electronic signature token and an identifier of an electronic signature token having a primary-backup relationship with the second electronic signature token.

12. A nontransitory computer readable medium stored there on a computer program according to claim 9, wherein the second instructions implementing the first verification component including instructions to verify the first signature in the private key backup request data packet using a CA public key.

13. A nontransitory computer readable medium stored there on a computer program according to claim 9, wherein the first instructions implementing the first sending component including instructions to sign the private key backup request data packet, and send the signed private key backup request data packet;

the second electronic signature token further comprises:

a third verification component including instructions to verify a signature of the signed private key backup request data packet, in which the first verification component verifies the first signature in the private key backup request data packet if the signature of the signed private key backup request data packet passes verification.

14. A nontransitory computer readable medium stored there on a computer program according to claim 9, wherein the second instructions implementing the second sending component including instructions to sign the private key backup response data packet, and send the signed private key backup response data packet; and the first electronic signature token further comprises:

a fourth verification component including instructions to verify a signature of the signed private key backup response data packet, in which the second verification component verifies the second signature in the private key backup response data packet if the signature of the signed private key backup response data packet passes verification.

15. The system according to claim 9, wherein the encrypting component is configured to obtain a first secret key, and to encrypt the private key of the second electronic signature token using the first secret key, so as to obtain the encrypted private key of the second electronic signature token, in which the first secret key is matched with a second secret key stored in the first electronic signature token; and the decrypting component is configured to obtain the second secret key locally, and to decrypt the encrypted private key of the second electronic signature token using the second secret key.

16. A system for backing up a private key of an electronic signature token, comprising:

a first electronic signature token comprising first non-transitory computer readable instructions that when executed by a processor of the first electronic signature token implement a first sending component, a second verification component, a second determining component, a decrypting component and a first negotiation component, and a second electronic signature token comprising second non-transitory computer readable instructions that when executed by a processor of the second electronic signature token implement a first verification component, a first determining component, an encrypting component, a second sending component, and a second negotiation component, each of the first negotiation component and the second negotiation component is configured to obtain a correspondence relationship among matching codes, encrypting strategies and decrypting strategies, to search for the encrypting strategy and the decrypting strategy corresponding to the matching code according to the correspondence relationship; and to take the encrypting strategy and the decrypting strategy found as the encrypting strategy and the decrypting strategy corresponding to the encrypting strategy used for communication between the first electronic signature token and the second electronic signature token if the encrypting strategy and the decrypting strategy are found, the first sending component is configured to send a private key backup request data packet, in which the private key request data packet comprises a first signature, and the first signature is obtained by signing at least a first indication information using a CA private key, the first indication information recording a primary-backup relationship of the first electronic signature token;

the first verification component is configured to verify the first signature in the private key backup request data packet after receiving the private key backup request data packet;

the first determining component is configured to determine according to the first indication information whether the first electronic signature token has a primary-backup relationship with the second electronic signature token, if the first signature passes verification;

the encrypting component is configured to encrypt a private key of the second electronic signature token using the encrypting strategy to obtain an encrypted private key of the second electronic signature token if the first electronic signature token has a primary-backup relationship with the second electronic signature token;

the second sending component is configured to send a private key backup response data packet in which the private key backup response data packet comprises a second signature and the encrypted private key of the second electronic signature token, and the second signature is obtained by signing at least a second indication information using the CA private key, the second indication information recording a primary-backup relationship of the second electronic signature token;

the second verification component is configured to verify the second signature in the private key backup response data packet after receiving the private key backup response data packet;

the second determining component is configured to determine according to the second indication information whether the second electronic signature token has the primary-backup relationship with the first electronic signature token, if the second signature passes the verification; and the decrypting component is configured to decrypt the encrypted private key of the second electronic signature token in the private key backup response data packet using the decrypting strategy to obtain the private key of the second electronic signature token, if the second electronic signature token has the primary-backup relationship with the first electronic si nature token.

\* \* \* \* \*